United States Patent
Larminy

(10) Patent No.: US 12,466,466 B2
(45) Date of Patent: Nov. 11, 2025

(54) SYSTEM FOR ASSISTING A DRIVER TO GET IN AND OUT OF A VEHICLE

(71) Applicant: JTEKT EUROPE, Irigny (FR)

(72) Inventor: Pierre Larminy, Billy sous les Cotes (FR)

(*) Notice: Subject to any disclaimer, the term of this patent is extended or adjusted under 35 U.S.C. 154(b) by 500 days.

(21) Appl. No.: 18/018,633

(22) PCT Filed: Jul. 23, 2021

(86) PCT No.: PCT/FR2021/051388
§ 371 (c)(1),
(2) Date: Jan. 30, 2023

(87) PCT Pub. No.: WO2022/023657
PCT Pub. Date: Feb. 3, 2022

(65) Prior Publication Data
US 2023/0303153 A1    Sep. 28, 2023

(30) Foreign Application Priority Data
Jul. 28, 2020   (FR) ...................... 20/07960

(51) Int. Cl.
*B62D 5/00* (2006.01)
*B62D 6/00* (2006.01)

(52) U.S. Cl.
CPC ............. *B62D 5/008* (2013.01); *B62D 5/006* (2013.01); *B62D 6/008* (2013.01)

(58) Field of Classification Search
CPC ................................. B62D 5/008; B62D 5/006
See application file for complete search history.

(56) References Cited

U.S. PATENT DOCUMENTS 11,161,541 B2 * 11/2021 Hwang ................. B62D 6/008
2019/0389503 A1   12/2019 Hwang et al.

FOREIGN PATENT DOCUMENTS

| CN | 110871833 A | * | 3/2020 | ............. B62D 1/181 |
| JP | 11147482 A | * | 6/1999 | |
| JP | 2009-090686 A | | 4/2009 | |
| WO | 00/64726 A1 | | 11/2000 | |

OTHER PUBLICATIONS

Oct. 22, 2021 International Search Report issued in International Patent Application No. PCT/FR2021/051388.
Oct. 22, 2021 Written Opinion issued in International Patent Application No. PCT/FR2021/051388.

\* cited by examiner

*Primary Examiner* — Kevin Hurley
(74) *Attorney, Agent, or Firm* — Oliff PLC

(57) ABSTRACT

A system for assisting a driver to get in and out of a vehicle, including a steering device with: a steering column having a longitudinal axis about which the steering column may pivot, said column being connected to a steering wheel, and a force feedback module fixed to the steering column, said module including a controller capable of calculating a force and an actuator capable of applying said force to the steering column so as to cause the steering column to pivot about the longitudinal axis to guide the steering column connected to the steering wheel in a predetermined position when a driver is getting in and out, lock the steering column connected to the steering wheel in the position predetermined when a driver is getting in and out. A vehicle includes said system and a method for assisting a driver to get in and out of the vehicle.

14 Claims, 2 Drawing Sheets

SYSTEM FOR ASSISTING A DRIVER TO GET IN AND OUT OF A VEHICLE

The present invention concerns a system for assisting a driver to get in and out of a vehicle, a vehicle comprising said system and a method for assisting a driver to get in and out of a vehicle. The present invention is particularly suitable for the automotive industry.

In general, in a motor vehicle equipped with a Steer-by-Wire type steering system, there is no mechanical link between the control member of the wheels, namely the steering wheel for example, and the steered wheels.

The traditional steering column is replaced by electrical connections capable of transmitting control commands generated from the rotation of the steering wheel, to actuators, generally electrical, which ensure control of the steering angle of the steered wheels.

In a steering control system of the Steer-by-Wire type, it is necessary to reproduce for the driver the driving sensations essential for good control of a vehicle.

In fact, the sensations perceived by the driver via the steering wheel play a key role in his ability to steer his vehicle.

To date, many steering systems are known, they are equipped with a force feedback module whose main function is to deliver a force feedback on the steering wheel in such a way that the driver feels the state of the road as the change of grip or the like in the same way as with a mechanical type motor vehicle steering system.

This force feedback module thus simulates the forces that would be felt with a conventional mechanical steering system.

In the automotive industry, steering control system of the Steer-by-Wire type makes it possible in particular to move towards the development of vehicles with autonomous driving phases, that is to say driving phases during which the driver is relieved of any action on the steering wheel.

Moreover, the traditional steering column is generally equipped with a «Neiman» type anti-theft device. This anti-theft device has the main function of preventing or slowing down vehicle theft by blocking the steering system when the vehicle ignition is off. This device has the secondary function of making it easier for the driver to get in and out. Indeed, the steering wheel acts as a handle so that the driver leans on it to enter and exit the vehicle.

In a Steer-by-Wire type steering control system, the anti-theft device is removed since the anti-theft function is ensured by the fact that there is no longer any mechanical link between the steering wheel and the wheels. Thus, when the ignition is off, it is not possible to turn the vehicle using the steering wheel. Moreover, the absence of the anti-theft device allows a gain in volume of the force feedback module.

However, it is no longer made easy for the driver to get in and out. Indeed, when the driver unlocks the vehicle using a remote transmitter or a key to be inserted into the vehicle door latch, the steering wheel is no longer blocked. If the driver leans on the steering wheel, it is likely to turn, creating a risk of injury to the driver.

The object of the invention is to remedy the aforementioned drawbacks by suggesting a steering system of the Steer-by-Wire type making it easier for the driver to get in and out of the vehicle.

The subject of the invention is a system for assisting a driver to get in and out of a vehicle, said system comprising a steering device comprising:

a steering column having a longitudinal axis about which the steering column may pivot, said steering column being connected to a steering wheel, and a force feedback module fixed to the steering column, said force feedback module comprising a controller capable of calculating a force and an actuator capable of applying said force to the steering column so as to cause the steering column to pivot about the longitudinal axis in order to guide the steering column connected to the steering wheel in a predetermined position when a driver is getting in and out, lock the steering column connected to the steering wheel in the position predetermined when a driver is getting in and out.

Thanks to the assistance system according to the invention, in particular thanks to the controller of the force feedback module, the steering column and consequently the steering wheel pivot about the longitudinal direction of the steering column to reach a predetermined position, i.e. the optimal position to help the driver enter and exit the vehicle. The driver may thus lean on the steering wheel, which acts as a handle, without injuring himself.

By predetermined position of the steering wheel, it should be understood the optimal position of the steering wheel which makes it easier for the driver to get in and out.

In one embodiment, the steering wheel comprises a continuous annular wall surrounding a cavity, a base located at the center of the cavity, and at least two side arms connecting the base and the annular wall. The plane of the base of the steering wheel is for example perpendicular to the longitudinal axis of the steering column.

In one embodiment, the steering wheel comprises a discontinuous annular wall, that is to say having at least two ends which are not connected to each other, surrounding a cavity. The annular wall may be connected to a base located at the center of the cavity by at least two side arms. The plane of the base of the steering wheel is for example perpendicular to the longitudinal axis of the steering column.

Preferably, the steering wheel reaches the predetermined position when a portion of the annular wall that does not comprise the at least two side arms is adjacent to the door of the vehicle on the driver's side. In one embodiment, the assistance system comprises at least one sensor configured to detect when a driver is getting in and/or out of a vehicle.

In one embodiment, the at least one sensor is located in a safety belt disposed on a driver's seat of a vehicle. Preferably, the at least one sensor is located on the safety belt so that the sensor detects the putting on of the safety belt when the driver gets in the vehicle or the removal of the safety belt when the driver gets out of the vehicle.

In one embodiment, the at least one sensor is located in a vehicle driver's seat. Preferably, the at least one sensor is located in the base of the driver's seat and, optionally, in the seat back of the driver's seat. In this embodiment, the sensor detects the weight of the driver and thus the presence of the driver on the vehicle seat.

In one embodiment, the at least one sensor is located in a door of a vehicle.

In one embodiment, the at least one sensor is connected to the shut-down or start-up system of a vehicle.

In one embodiment, the sensor is a load sensor, a pressure sensor, a door switch, or an optical sensor.

In one embodiment, the steering device according to the invention comprises steering control means of the steering wheels of the vehicle.

For example, these steering means are controlled by an electronic control unit (ECU) of the vehicle or by the position of the steering wheel induced by the driver.

For example, the steering means of the vehicle comprise a rack and pinion connected to the steered wheels of the vehicle and an actuator fixed to the rack and pinion, said actuator making it possible to move the rack and pinion.

In one embodiment, the force is a motor torque.

In one embodiment, the actuator is a magnetorheological fluid or a motor.

The invention also relates to a vehicle comprising an assistance system making it easier for a driver to get in and out of a vehicle according to the invention, an electronic control unit (ECU), a driver's seat, a safety belt safety disposed on a driver's seat, a door and a shut-down and start-up system of a vehicle.

The ECU is used to control the various electrical systems of the vehicle.

In one embodiment, the controller is connected to the ECU or integrated directly into the ECU.

Finally, the subject of the invention is a method for assisting a driver to get in and out of a vehicle according to the invention, said method comprising:

A. detecting when the driver is getting in or out of the vehicle and

B. calculating a force by a controller and applying said force by an actuator to the steering column so as to cause the steering column to pivot about the longitudinal axis of the steering column in order to guide the steering column connected to the steering wheel in a predetermined position when a driver is getting in and out and C. blocking the steering wheel in the predetermined position using the controller when a driver is getting in and out.

The method according to the invention makes it possible to modify the arrangement of the steering column and consequently of the steering wheel so that the steering wheel is in an optimal position and to block it in this position allowing the driver to lean on it and thus making it easier for him to get in and out of a vehicle without risk of injury.

In one embodiment, in step A), the detection of when the driver is getting in is performed when the vehicle is unlocked and the detection of when the driver is getting out is performed when the vehicle is shut-down, i.e. when the ignition of the vehicle is off.

In one embodiment, in step A), the vehicle is unlocked by means of a transmitter capable of remotely controlling the opening and closing of the doors of a vehicle remotely or by means of a key capable of opening and closing doors of a vehicle.

In this embodiment, preferably in step A), the ECU detects the unlocking of the vehicle. In this embodiment, it appears that when the driver unlocks the vehicle, the ECU powers up and detects the unlocking of the vehicle.

In one embodiment, the method comprises a step D) located between step A) and step B) in which the ECU transmits the unlocking of the vehicle to the controller.

In one embodiment, in step A), the detection of the shut-down of the vehicle is carried out by means of a sensor. By shut-down of the vehicle it should be understood turning off the ignition of the vehicle.

In one embodiment, the method comprises a step E) including the detection of when the driver is getting in or out of the vehicle by using at least one sensor.

In one embodiment, the detection of when the driver is getting in or out of the vehicle is transmitted by the sensor to the ECU.

In one embodiment, the method comprises a step F) including unblocking the steering wheel from the predetermined position.

In one embodiment, the ECU transmits to the controller the information indicating that the driver is getting in or out of the vehicle so that the controller unblocks the steering wheel from the predetermined position.

The invention will be better understood, thanks to the following description, which relates to one or several embodiments according to the present invention, given by way of non-limiting examples and explained with reference to the attached schematic drawings, in which.

Figure 1:
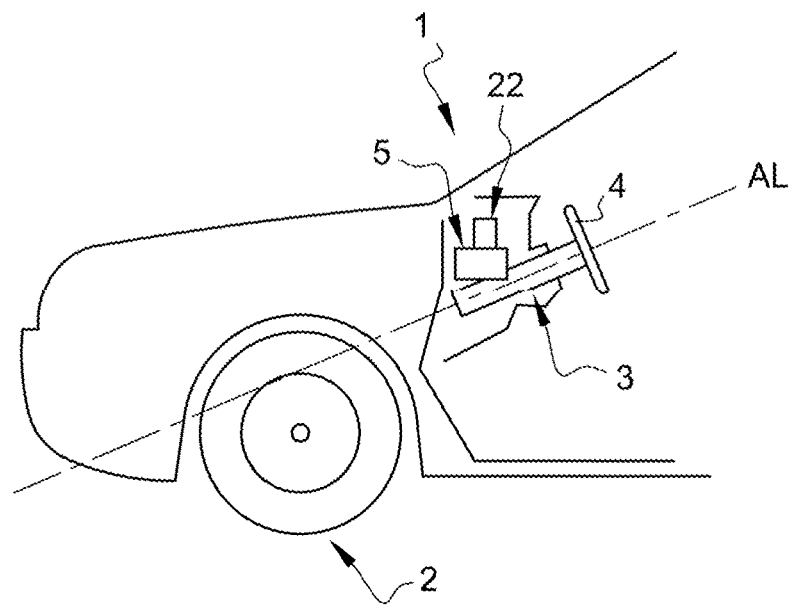
FIG. 1 is a transverse view of a vehicle according to the invention.
Figure 2:
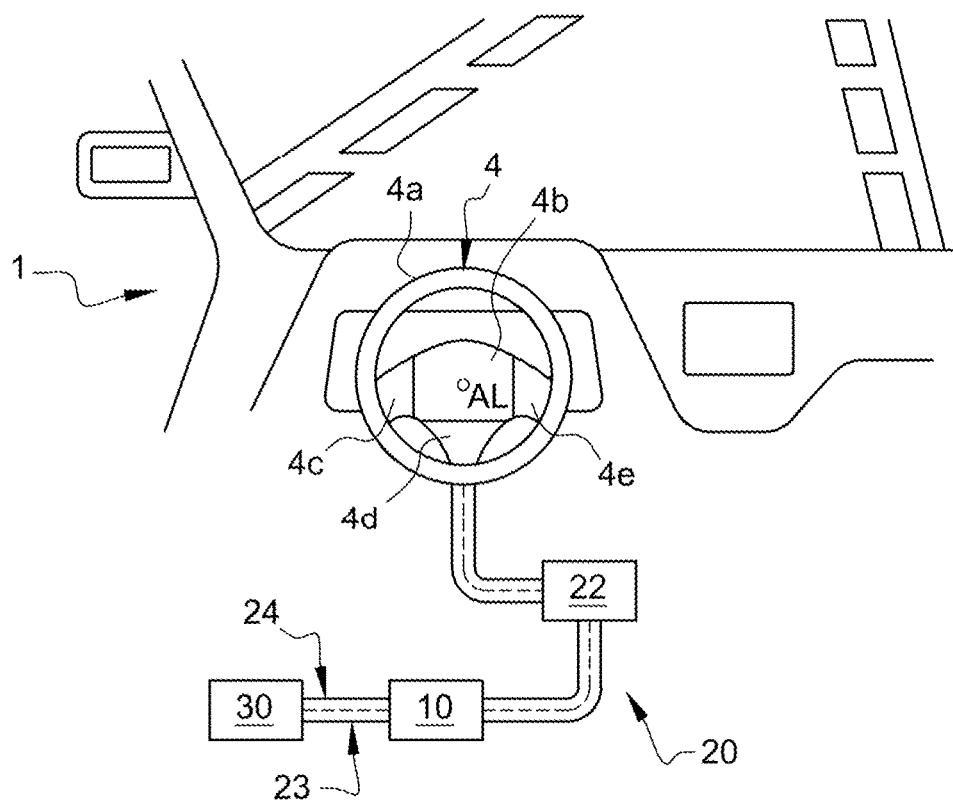
FIG. 2 is a view of a vehicle cabin according to the invention.

FIGS. 1 and 2 illustrate a vehicle 1 comprising a system 20 for assisting a driver when getting in and out of a vehicle. The assistance system 20 comprises a steering device (not represented) comprising a rack and pinion (not represented) connected to the steering wheels 2 of the vehicle 1. An actuator (not represented) is fixed on the rack and pinion, said actuator allowing the rack and pinion to be displaced.

The assistance system 20 also comprises a steering column 3 having a longitudinal axis $A_L$. The steering column 3 is connected to a steering wheel 4, said steering wheel being able to pivot about a longitudinal axis $A_L$ of the steering column 3.

The assistance system 20 further comprises a force feedback module 5 fixed to the steering column 3, said force feedback module 5 comprising a controller 22 capable of calculating a force, for example a motor torque, and an actuator (not represented) capable of applying, for example, said motor torque to the steering column 3 so as to cause the steering column 3 to pivot about the longitudinal axis $A_L$ in order to guide the steering wheel 4 in a predetermined position when a driver 32 is getting in and out, blocking the steering column 3 connected to the steering wheel 4 in the position predetermined when a driver 32 is getting in and out. For example, the controller 22 is located on the force feedback module 5. The controller 22 may be connected to ECU 10.

The vehicle 1 may also comprise a CAN bus 23. This network 23 comprises the electrical wiring 24 of the vehicle 1 configured to establish an electrical connection and a communication between the force feedback module 5, for example a sensor 30 and various components of the vehicle. The wiring harness 24 may usually be connected to the ECU 10.

The steering wheel 4 may comprise a continuous annular wall 4a surrounding a cavity, a base 4b located in the center of the cavity and for example three side arms 4c, 4d, 4e connecting the base 4b and the annular wall 4a. The base 4b of the steering wheel 4 is for example located in a plane perpendicular to the longitudinal axis $A_L$ of the steering column 2.

Figure 3:
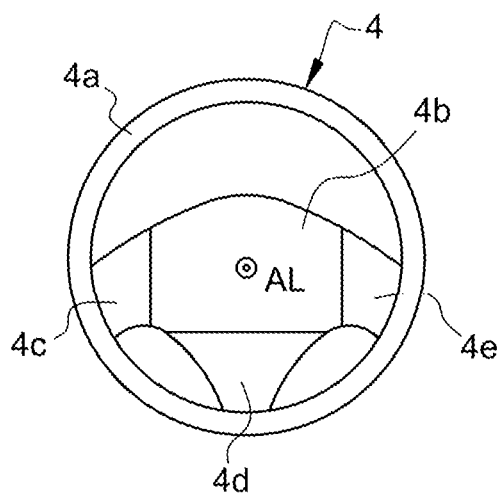
FIG. 3 is an example of the steering wheel's initial position.

FIG. 3 illustrates an example of an initial position of the steering wheel in which the side arm 4c of the steering wheel prevents the driver from leaning on the steering wheel to get in or out of the vehicle in the case where the driver side door is located on the left of the side arm 4c. By initial position of the steering wheel, it should be understood the position in which the steering wheel is disposed when the driver unlocks the vehicle or the position in which the steering wheel is disposed when the driver switches off the ignition of the vehicle.

Figure 4:
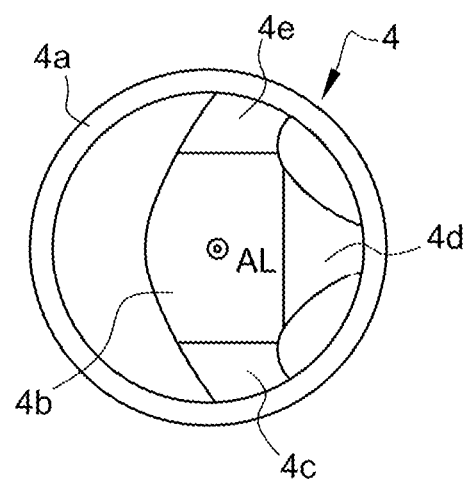
FIG. 4 is an example of the predetermined steering wheel's position.

FIG. 4 illustrates an example of a predetermined position of the steering wheel in which a portion of the annular wall 4a that does not comprise the side arms 4b, 4c, 4d is adjacent to the door of the vehicle 1 on the driver's side. Thus, the driver may lean on the portion of the annular wall 4a that does not comprise the side arms 4b, 4c, 4d to get in or out of the vehicle.

Figure 5:
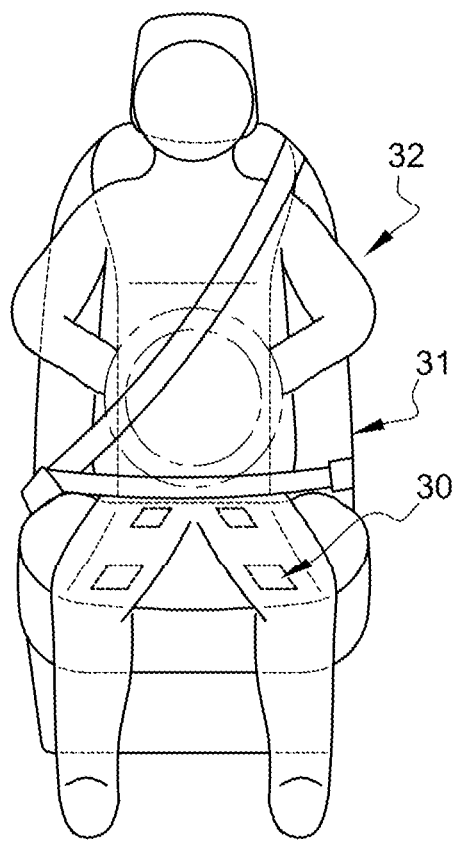
FIG. 5 is a view of a vehicle seat comprising at least one sensor according to an embodiment of the invention and FIG. 6 is a view of a vehicle seat comprising at least one sensor according to another embodiment of the invention.

With reference to FIGS. 2 and 5, the assistance system 20 may comprise for example four sensors 30 configured to detect when a driver 32 is getting in and/or out of a vehicle 1. In this example, four load sensors 30 are placed in the seat 31 of the vehicle so as to detect the weight or the absence of weight of the driver 32.

Figure 6:
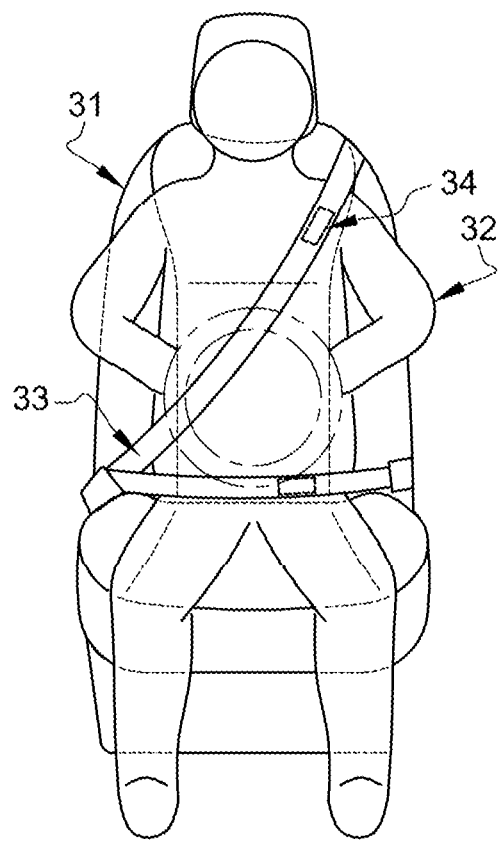

Referring to FIG. 6, alternatively, the driver 30 is seated on a driver's seat 31 comprising a safety belt 33; said safety belt 33 comprising for example two sensors 34. The sensors 34 may determine when the driver 32 is getting in or out by detecting the putting on of the safety belt or the removal of the safety belt. For example, the sensors 34 are pressure sensors.

In an example of a method for assisting a driver 32 to get in a vehicle 1, in a step A), the driver 32 unlocks the vehicle, for example by means of a transmitter capable of remotely controlling the opening and closing of the doors of a vehicle remotely. The ECU 10 may then switch on and detect the unlocking of the vehicle 1.

In a step D) set after step A), the ECU 10 may transmit the unlocking of the vehicle 1 to the controller 22.

In a step B), the controller 22 may calculate a motor torque allowing the steering column 3 to pivot about the longitudinal axis $A_L$ from an initial position (FIG. 3) to a predetermined position, for example represented in FIG. 4. The actuator may then apply said motor torque to the steering column 3 so as to guide the steering wheel 4 in the position.

In a step C), the controller 22 may block the steering wheel in its predetermined position (FIG. 4). Thus, the driver 32 will be able to get in the vehicle 1, in particular in the seat 31 of the vehicle 1.

In a step E), for example, the four sensors 30 may detect when the driver 32 gets in the seat 31 of the vehicle 1.

For example, the four sensors 30 may transmit the information indicating that the driver 32 is getting in the seat 31 to the ECU 10.

In a step F), the ECU 10 may transmit to the controller 22 the information indicating that the driver 32 is getting in the vehicle 1 so that the controller 22 unblocks the steering wheel 4 from the predetermined position. Thus, the driver 32 may start-up the vehicle and take the road.

In another example of the method for assisting the driver 32 to get out of a vehicle 1, in a step A), the driver may shut-down the vehicle 1, that is to say switch off the ignition.

For example, the detection of the shut-down of the vehicle 1 is carried out by means of the sensors connected to the start-up and shut-down system (not represented) of the vehicle 1.

In a step B), the controller 22 may calculate a motor torque making it possible for the steering column 3 to pivot about the longitudinal axis $A_L$ from an initial position (FIG. 3) to a predetermined position, for example represented in FIG. 4. The actuator may then apply said motor torque to the steering column 3 so as to guide the steering wheel 4 in the predetermined position.

In a step C), the controller 22 may block the steering wheel in its predetermined position (FIG. 4). Thus, the driver 32 will be able to get out of the vehicle 1, in particular in the seat 31 of the vehicle 1, by leaning on the steering wheel.

In a step E), for example, the two sensors 34 present on the safety belt 33 may detect when the driver is getting out.

In one embodiment, in step A), the detection of the shut-down of the vehicle is carried out by means of a sensor. By shut-down of the vehicle, it should be understood the switching off of the ignition of the vehicle.

For example, the two sensors 34 may transmit the information indicating that the driver 32 is getting out to the ECU 10.

In a step F), the ECU 10 may transmit to the controller 22 the information indicating that the driver 32 is getting out of the vehicle 1 so that the controller 22 unblocks the steering wheel 4 from the predetermined position. Thus, the driver 32 may exit the vehicle before locking it.

The assistance system and the method according to the invention make it easier to the driver to get in and out by allowing the driver to use the steering wheel as a handle without risking injury.

The invention claimed is:

1. A system for assisting a driver to get in and out of a vehicle, said system comprising a steering device comprising: a steering column having a longitudinal axis about which the steering column may pivot, said steering column being connected to a steering wheel, and a force feedback module fixed to the steering column, said force feedback module comprising a controller capable of calculating a force and an actuator capable of applying said force to the steering column so as to cause the steering column to pivot about the longitudinal axis in order to guide the steering column connected to the steering wheel in a predetermined position when a driver is getting in and out, locking the steering column connected to the steering wheel in the predetermined position when a driver is getting in and out.

2. The assistance system according to claim 1, comprising at least one sensor configured to detect when a driver is getting in and/or out of a vehicle.

3. The assistance system according to claim 2, wherein the at least one sensor is located in a safety belt disposed on a driver's seat of a vehicle, in a driver's seat of a vehicle, in a door of a vehicle or is connected to the shut-down or start-up system of a vehicle.

4. A vehicle comprising an assistance system making it easier for a driver to get in and out of a vehicle according to claim 1, an electronic control unit (ECU), a driver's seat, a safety belt disposed on a driver's seat, a door, a shut-down and start-up system of a vehicle.

5. The vehicle according to claim 4, wherein the controller is connected to the ECU or integrated directly into the ECU.

6. A method for assisting a driver to get in and out of a vehicle according to claim 4, said method comprising:
   A. detecting when the driver is getting in or out of the vehicle and
   B. calculating a force by the controller and applying said force by the actuator on the steering column so as to cause the steering column to pivot about the longitudinal axis of the steering column in order to guide the steering column connected to the steering wheel in a predetermined position when a driver is getting in and out and C. blocking the steering wheel in the predetermined position using the controller when a driver is getting in and out of the vehicle.

7. The method according to claim 6, wherein in step A), the detection of when a driver is getting in is performed when the vehicle is unlocked and the detection of when the driver is getting out is performed when the vehicle is shut-down.

8. The method according to claim 7, wherein in step A), the ECU detects the unlocking of the vehicle.

9. The method according to claim 7, wherein the method comprises a step D) set between step A) and step B) in which the ECU transmits the unlocking of the vehicle to the controller.

10. The method according to claim 7, wherein in step A), the detection of the shut-down of the vehicle is carried out by means of a sensor.

11. The method according to claim 6, wherein the method comprises a step E) including the detection of when the driver is getting in or out of the vehicle by using at least one sensor.

12. The method according to claim 11, wherein the detection of when the driver is getting in or out of the vehicle is transmitted by the sensor to the ECU.

13. The method according to claim 6, wherein the method comprises a step F) including the unblocking of the steering wheel from the predetermined position.

14. The method according to claim 13, wherein the ECU transmits to the controller the information indicating that the driver is getting in or out of the vehicle so that the controller unblocks the steering wheel from the predetermined position.

\* \* \* \* \*